United States Patent [19]
Signorelli et al.

[11] 4,043,607
[45] Aug. 23, 1977

[54] METHOD AND DEVICE FOR CONTROLLING DISC BRAKES

[75] Inventors: Louis Signorelli; Alain Yves Louis Marcel Geoffroy, both of Toulouse, France

[73] Assignee: Societe Nationale Industrielle Aerospatiale, Paris, France

[21] Appl. No.: 652,990

[22] Filed: Jan. 28, 1976

[30] Foreign Application Priority Data
Feb. 7, 1975 France .................................. 75.03835
Mar. 24, 1975 France .................................. 75.09038

[51] Int. Cl.² .............................................. B60T 8/02
[52] U.S. Cl. .............................. 303/100; 188/181 T; 244/111; 303/112
[58] Field of Search ............... 188/181 T; 303/93, 100, 303/112, 104; 244/111

[56] References Cited
U.S. PATENT DOCUMENTS

| | | | |
|---|---|---|---|
| 2,308,500 | 1/1943 | Eksergian | 303/112 |
| 3,362,757 | 1/1968 | Marcheron | 303/104 |
| 3,614,173 | 10/1971 | Branson | 303/93 |
| 3,689,120 | 9/1972 | Sumiyoshi | 303/112 |
| 3,711,162 | 1/1973 | Steinbrenner | 303/112 |
| 3,948,569 | 4/1976 | Gentet | 244/111 |

*Primary Examiner*—Trygve M. Blix
*Assistant Examiner*—Reinhard J. Eisenzopf
*Attorney, Agent, or Firm*—Merriam, Marshall, Shapiro & Klose

[57] ABSTRACT

The present invention relates to a method and device for controlling a hydraulic disc brake, particularly for heavy-transport aircraft, wherein the functioning of the brake is servo-controlled so that the braking torque which it exerts follows the variations of a predetermined reference torque.

10 Claims, 12 Drawing Figures

METHOD AND DEVICE FOR CONTROLLING DISC BRAKES

The present invention relates to a method and device for controlling disc brakes, particularly those used in the under-carriages of aircraft. It applies more particularly, although not exclusively, to carbon disc brakes.

Methods and devices for controlling brakes are already known, according to which the hydraulic tightening of the discs is effected so that the pressure of the fluid in a brake follows a predetermined law, particularly in dependence of the speed of the vehicle on which said brakes are mounted. In this way, it is possible to bring the braking pressure under control and to render it, to a certain extent, independent of the pressure exerted by the driver or pilot on the brake pedal.

However, these known methods and devices have a considerable drawback, in that the braking action exerted by a disc brake does not depend solely on the pressure of the hydraulic fluid feeding the brake, but also on parameters such as the nature of the brake, its degree of wear, its temperature, etc . . . or the state of the tire of the wheel with which the brake is associated, the state of the runway on which this tire travels, atmospheric conditions, etc . . .

Consequently, with a brake in which the pressure of the fluid is servo-controlled, the braking effect obtained is, at equal pressure, different according to the value of the other parameters of which the pressure servo-control does not take account.

It is an object of the invention to remedy this drawback and to this end, the method of controlling a hydraulic disc brake, associated with at least one wheel of a vehicle, particularly an aircraft, and actuated by a mobile member such as a pedal, is noteworthy, according to the invention, in that the braking torque actually exerted on the wheel is detected and in that, at least in clearly determined circumstances, this actual braking torque is servo-controlled by a reference braking torque, such that a determined value of said reference torque corresponds to a determined displacement of said member.

According to a first embodiment of the invention, the beginning of the braking operation is effected by direct control of the brake, without servo-control, the control being initiated only when the actual braking torque has reached a certain torque threshold, for example 300 mdaN. The braking by direct control of the brake is preferably effected according to a determined maximum gradient of increase in the pressure of the actuating fluid; this gradient may be included between 50 and 200 bars/s.

According to this first embodiment of the method of the invention, after having detected the braking torque actually exerted on the wheel by the brake controlled by its actuating member, this detected torque is compared with a predetermined value, after which, in the case of the detected value being lower than the predetermined value, said member directly actuates the brake, whilst, in the case of the detected value being greater than this predetermined value, said member actuates the brake by means of the torque servo-control.

In order to avoid the torque peak due to the rapid increase of the pressure in the brake, it is advantageous if the value of the reference torque is zero at the moment when the braking torque obtained by direct action reaches said predetermined value.

When the speed of the wheel is lower than said speed threshold, the brake is advantageously directly actuated in the sense of a braking, whilst the servo-control then functions only in the sense of a brake-release. In this way, the torque regulation loop functions only when the braking torque exceeds the value of the predetermined maximum torque. The regulation thus functions by peak-chopping of the torque: as long as the braking torque remains lower than the predetermined maximum value, the braking pressure is transmitted directly to the brake, the peak-chopping function (controlled by the servo-control) acting only to prevent the braking torque from exceeding the predetermined maximum value.

According to a second embodiment of the invention, after comparison of the braking torque actually exerted and of the reference torque, if the detected value of the braking torque actually exerted is lower than the corresponding value of the reference torque, said member continues to actuate the brake alone, whilst, in the opposite case, whatever the speed of the wheel, the detected value of the braking torque is reduced to bring it to the corresponding value of the reference torque.

Furthermore, it is known that, due to their very structure, the hydraulic disc brakes do not present a linear response at the beginning of actuation of the member, and that the pressure of the hydraulic fluid in said brake firstly increases less rapidly than provided for (so-called "filling" phenomenon of the brake) after which it increases to a more rapid rate. Consequently, the functioning of the torque servo-control risks being disturbed.

This is why, for the two embodiments, the beginning of braking is provided to be by direct control.

In the two embodiments, the value of the reference torque may advantageously increase with the displacement of said member (depression of the pedal) up to a certain position of said member, beyond which the reference torque may take a maximum threshold value independent of said displacement.

The maximum value of the reference torque corresponds to a value of the brake torque not to be exceeded, in view of the structural characteristics of the discs of the brake. However, in the case of an aircraft, for example, this value of the brake torque not to be exceeded also depends on the fact that the aircraft is moving or is "static" (i.e. stationary with brakes on, but with reactors exerting full thrust). For example, in the case of carbon discs, the brake torque must remain lower than 2550 mdaN during travel and 3100 mdaN at "static". In this way, it is possible to provide two laws of variation of reference torque (with, for example, respective thresholds of 2100 and 2600 mdaN), the servo-control obeying one or the other depending whether the wheel is advancing at a speed higher or lower than a speed threshold. This speed threshold (e.g. 3 m/s) may obviously be detected by a tachometric generator connected to said wheel or another wheel, such as the nose wheel of an aircraft.

In its part for which the value of the reference torque increases with the displacement of the member controlling the brake (depression of the pedal), each of the two servo-control laws may be linear or, on the contrary, nonlinear, for example in order to increase the progressiveness of the depression of the pedal if this depression is only slight. The braking by direct control of the brake by said member is preferably effected according to a determined maximum gradient of increase in the pressure of the actuating fluid.

Moreover, a device is provided for limiting the maximum pressure permitted in the brakes, as well with direct functioning as with torque peak-chopping or servo-control.

The actual value of the braking torque exerted on the wheel is advantageously detected by sensors, such as strain gauges, disposed on mechanical parts connected to said wheel and undergoing this torque. In the case of an undercarriage comprising a landing gear articulated on the column and brake rods disposed between the column and each thrust plate of the brakes, it is advantageous if said sensors are arranged on said brake rods.

In accordance with the invention, a device for controlling a hydraulic disc brake associated with at least one wheel of a vehicle, particularly an aircraft, and actuated by a mobile actuating member, which device comprises a transducer for converting the displacement of said actuating member into an electric signal and a servo-valve for controlling the hydraulic fluid in the brakes controlled by a control winding, is noteworthy in that it comprises at least one sensor producing a first electric signal representing the braking torque actually exerted on the wheel when the brake is actuated by said actuating member and supplying this first electric signal to a device, arranged between said transducer and said control winding, producing, as a function of the displacement of said actuating member, at least a second electric signal representing a reference braking torque to be obtained and controlling the feed of said control winding by this second signal.

Between said transducer and the control winding of the servo-valve, the device according to the invention preferably comprises an electric circuit composed of two branches in parallel, that may be used alternately, the first of said branches corresponding to the direct action of said member on the brake and the second to the torque servo-control of the functioning of the brake.

In order to carry out the first embodiment of the method according to the invention, it is advantageous if at least a first contact inhibiting, in rest position, the action of said branch, be associated with the second branch of circuit corresponding to servo-control functioning, whilst with the first branch of circuit is associated a second contact allowing, in its rest position, the action of said second branch, said device comprising, moreover, first means for producing a signal indicating simultaneously that the hydraulic feed electrovalve of the servo-valve is energized and that the braking torque is greater than the predetermined value, the signal produced by said means being capable of tripping the first and the second contact.

In this device, a third contact, of which the rest position normally inhibits the functioning of the first branch of circuit, is mounted in parallel on the second contact, whilst a fourth contact is associated with the second branch of circuit, so that, at rest, it allows the action of said branch, said third and fourth contacts being actuated by second means producing a signal indicating that the speed of the wheel is greater than said speed threshold, and in its operating position, said fourth contact permitting the functioning of the servo-control only in the sense of a brake-release. Of course, the second means may be used for commutating one servo-control law to the other.

In the case of a device intended for carrying out the second embodiment of the method according to the invention, the branch corresponding to the servo-control functioning may comprise a servo-control device functioning both for braking and brake-release, a unidirectional conduction device being associated with said servo-control device in order that only its brake-release action be transmitted to the servo-valve.

According to a preferred variant embodiment of this latter device, the two branches in parallel are connected on the servo-valve side by a device enabling their signals to be combined, the branch corresponding to the servo-control functioning comprising a polarized unidirectional conduction device receiving the signal from the means of comparison between the braking torque actually exerted on the wheel and the corresponding reference torque, said polarized device being conducting, in the sense of a brake release, only when the polarity of the comparison signal indicates that the braking torque exerted on the wheel is greater than said reference torque.

The device is preferably regulated for a low brake gain so that it produces a permanent peak-chopping servo-control action. Such a polarized, unidirectional conduction device may be formed by at least one operational amplifier with differential inputs.

In the case of the devices according to the invention being associated with a braking regulating device intended to avoid the locking of the wheel which is braked, means may be provided in the first and second branch of circuit, to bring into action signals emitted by this regulating device.

Such means may be constituted by sets of contacts.

In the case of the device corresponding to the second embodiment of the method, these contacts may cut out the circuit branch corresponding to direct braking, whilst maintaining the value of the braking measured at the moment of the action of the regulating device and modifying the voltage reference of the polarized unidirectional conduction device. It is therefore possible rapidly to act in the sense of a brake release of a locked wheel.

Said sets of contacts may in particular commutate on the polarized unidirectional conduction device, a memorising device having memorised the value of the braking at the moment of the action of the regulating device.

Different delay devices may be introduced into the electric circuit of these devices to render their functioning more smooth.

Furthermore, in order to avoid the amplification by the devices according to the invention of the effect of the vibrations peculiar to the wheel or its support, and capable of disturbing the functioning of said devices, it is advantageous if said devices comprise a band-cut-out filter whose frequency corresponds to said vibrations.

The invention will be more readily understood on reading the following description with reference to the accompanying drawings, in which:

FIG. 1 schematically shows, in longitudinal section corresponding to line II—II of FIG. 2, a landing gear of a heavy-transport aircraft to which the invention is applied.

Figure 11:
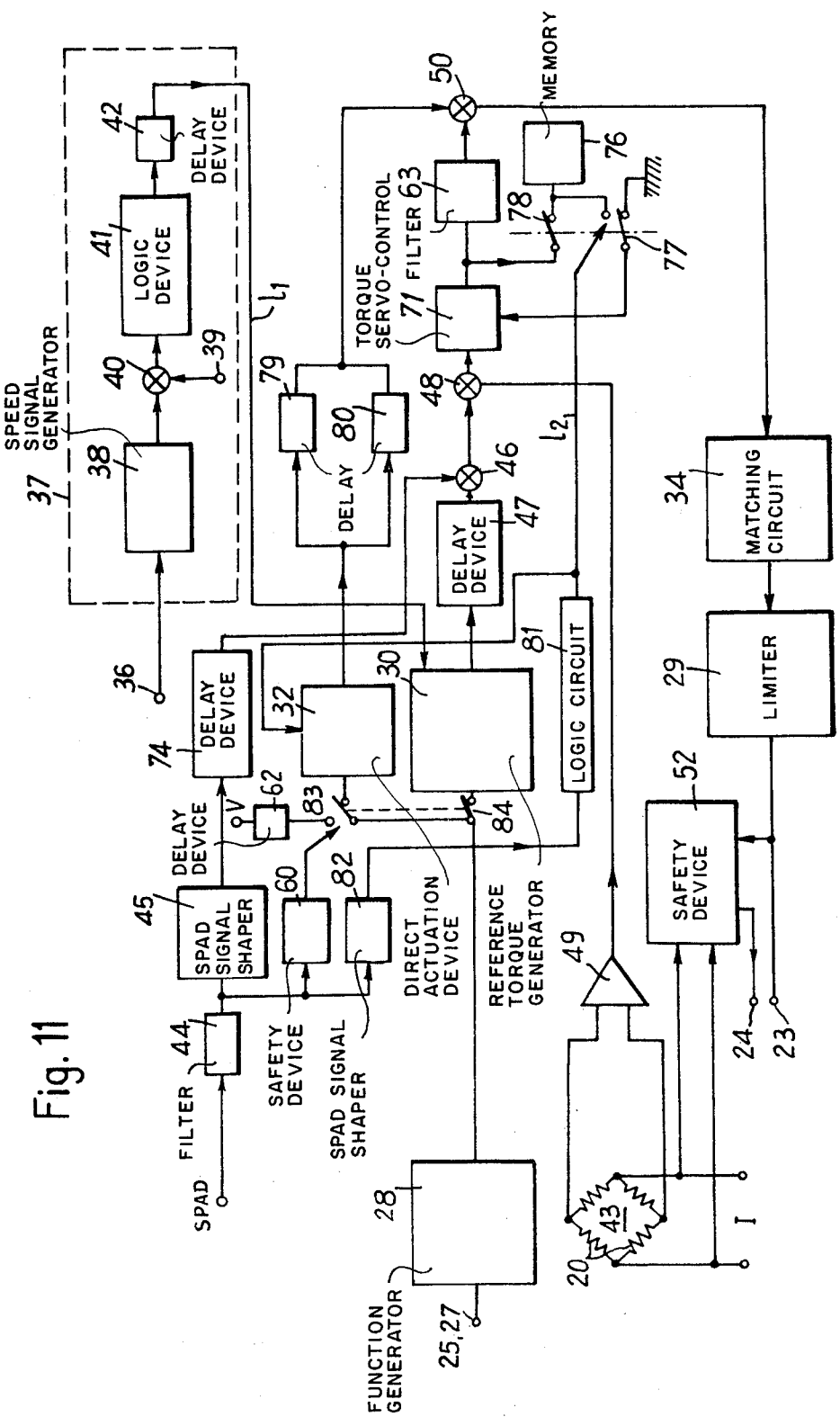
FIG. 11 is a block diagram of a more complete braking device than that of FIG. 10.
Figure 12:
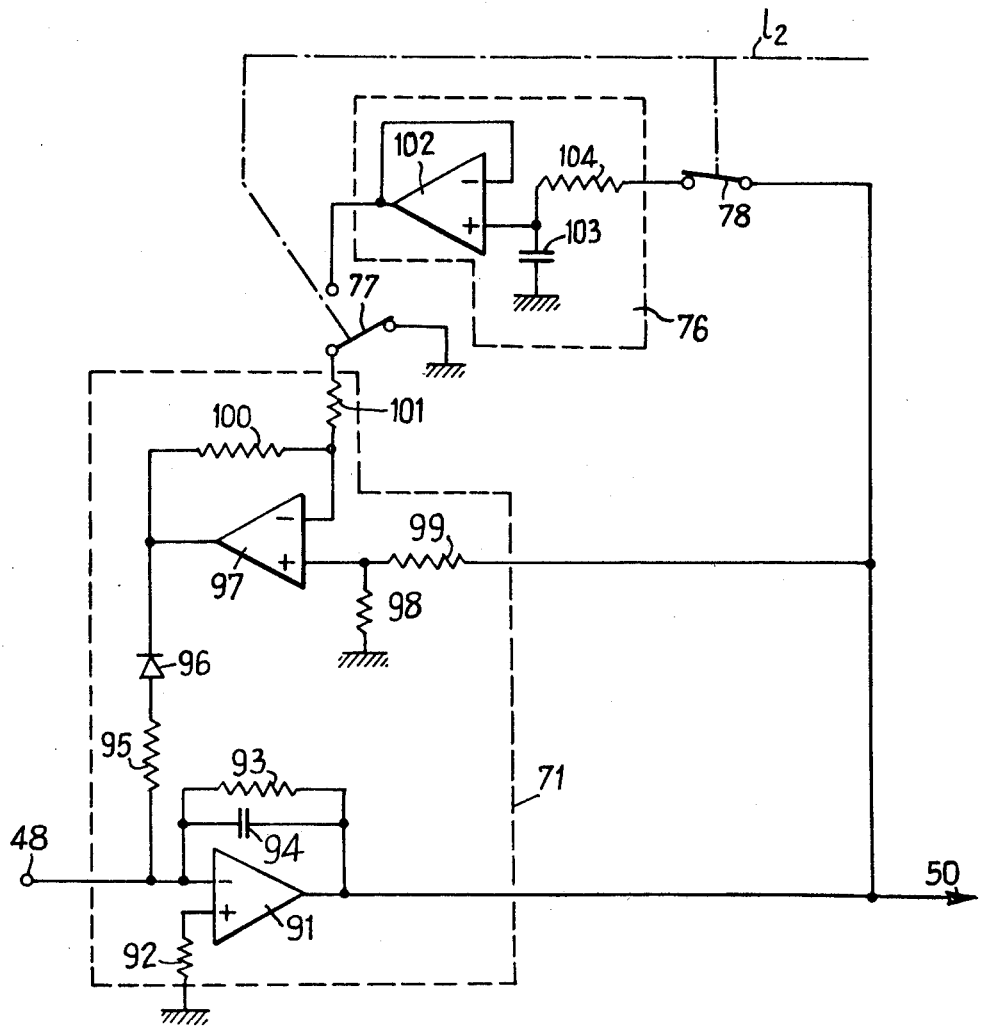

FIG. 12 gives the detailed diagram of the polarized unidirectional conduction device of FIG. 11.

Figure 1:
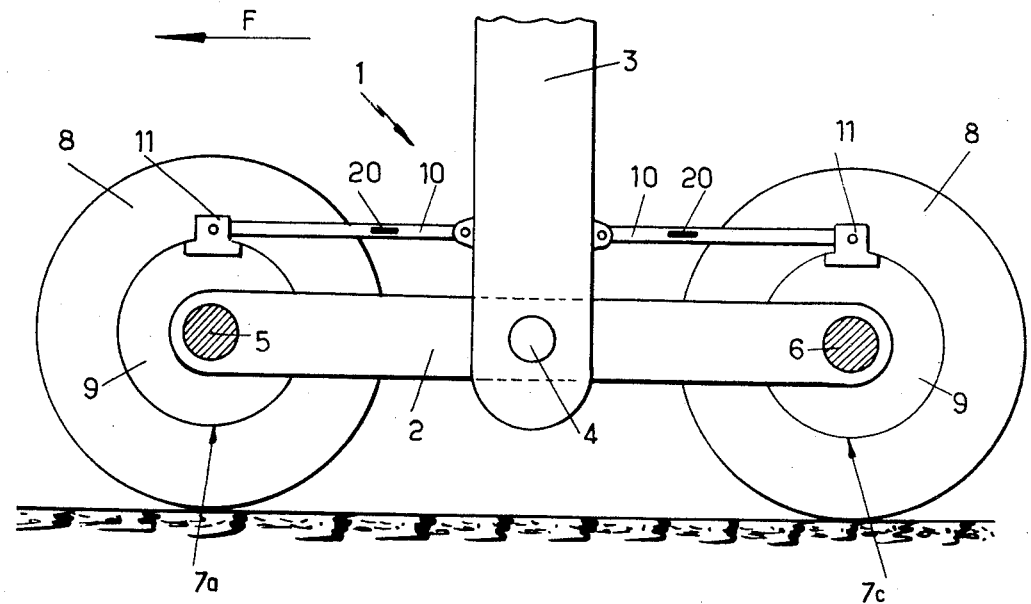
Figure 2:
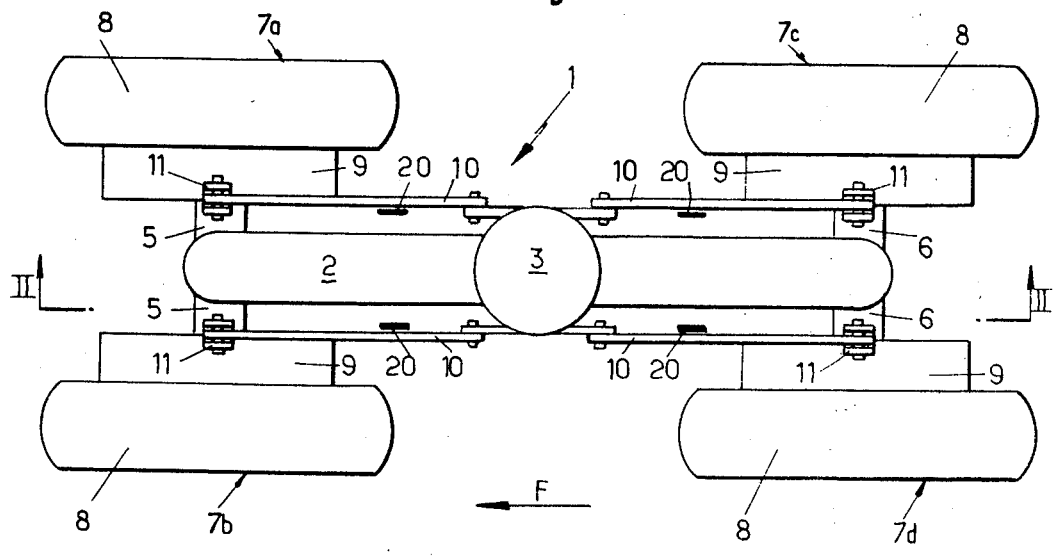
FIG. 2 is a plan view of the landing gear of FIG. 1.

Referring now to the drawings, the landing gear 1 of the undercarriage of a heavy-transport aircraft, shown in FIGS. 1 and 2, comprises a longitudinal boom 2 articulated at its center to the lower part of a column 3, about a horizontal axis 4. The top part of the column 3 is fast with the fuselage (not shown) of the aircraft.

At its two ends, the boom 2 is provided with transverse shafts 5 or 6, on each of which are mounted two twin wheels 7a, 7b or 7c, 7d provided with tires 8. With each wheel 7a to 7d (hereinafter generally designated as 7) there is associated a disc brake 9 of which the torque plate is prevented from rotating by a brake rod 10. To this end, each brake rod 10 is articulated at one of its ends, to the column 3 and at its other end, to a fork-joint 11 fast with said corresponding torque plate.

Figure 3:
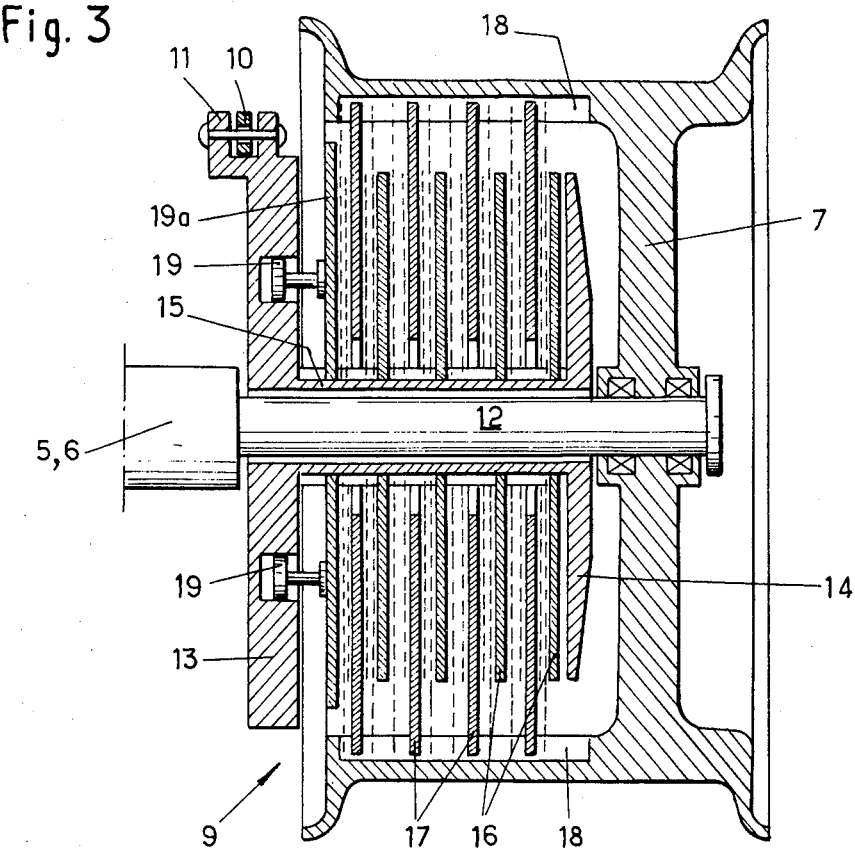
FIG. 3 is a schematic part sectional view of a brake associated with a wheel of a landing gear of FIGS. 1 and 2.

As shown in FIG. 3 (which schematically shows a section through a wheel 7-brake 9 assembly), at their end opposite the boom 2, the shafts 5 and 6 are shaped as spindle 12 for a wheel 7 (shown without its tire 8). On this spindle 12 is also mounted the brake 9 which comprises a torque plate 13 and a holding plate 14, centered on said spindle and connected together by a channeled sleeve 15 coaxial with said spindle.

On the sleeve 15, between the plates 13 and 14, are stacked friction discs, carbon discs for example. In FIG. 3, these discs are shown in broken lines for simplification and clarity. Certain discs, which bear reference numeral 16, comprise internal teeth engaged in channels of the channeled sleeve 15. Others, which are designated by reference 17, comprise external teeth engaged in channels 18 made on the periphery of the inner face of the wheel rim 7. The stacking of the discs is such that each disc 16 or 17 may slide parallel to the longitudinal axis of the spindle 12 and that each disc 16 is placed between two discs 17 and vice versa.

Jacks 19, arranged in the torque plate 13, enable the discs 16, 17 to be pressed against each other in the direction of the holding plate 14, in order to brake the rotation of the wheel 7 with respect to the spindle 12. The action of the jacks 19 on the discs 16 and 17 is exerted by means of a thrust plate 19a.

Assuming that the undercarriage 1 moves in the direction of arrow F (FIGS. 1 and 2), it will be noted that a braking action of the brakes 9 is translated by a compression of the brake rods 10 disposed between the column 3 and the rear wheels (7c and 7d) and by a traction of the brake rods 10 disposed between the column 3 and the front wheels (7a and 7b). Strain gauges 20 may therefore be placed on these brake rods 10 to measure the braking torque exerted by the brakes 9 on the wheels 7.

Figure 4:
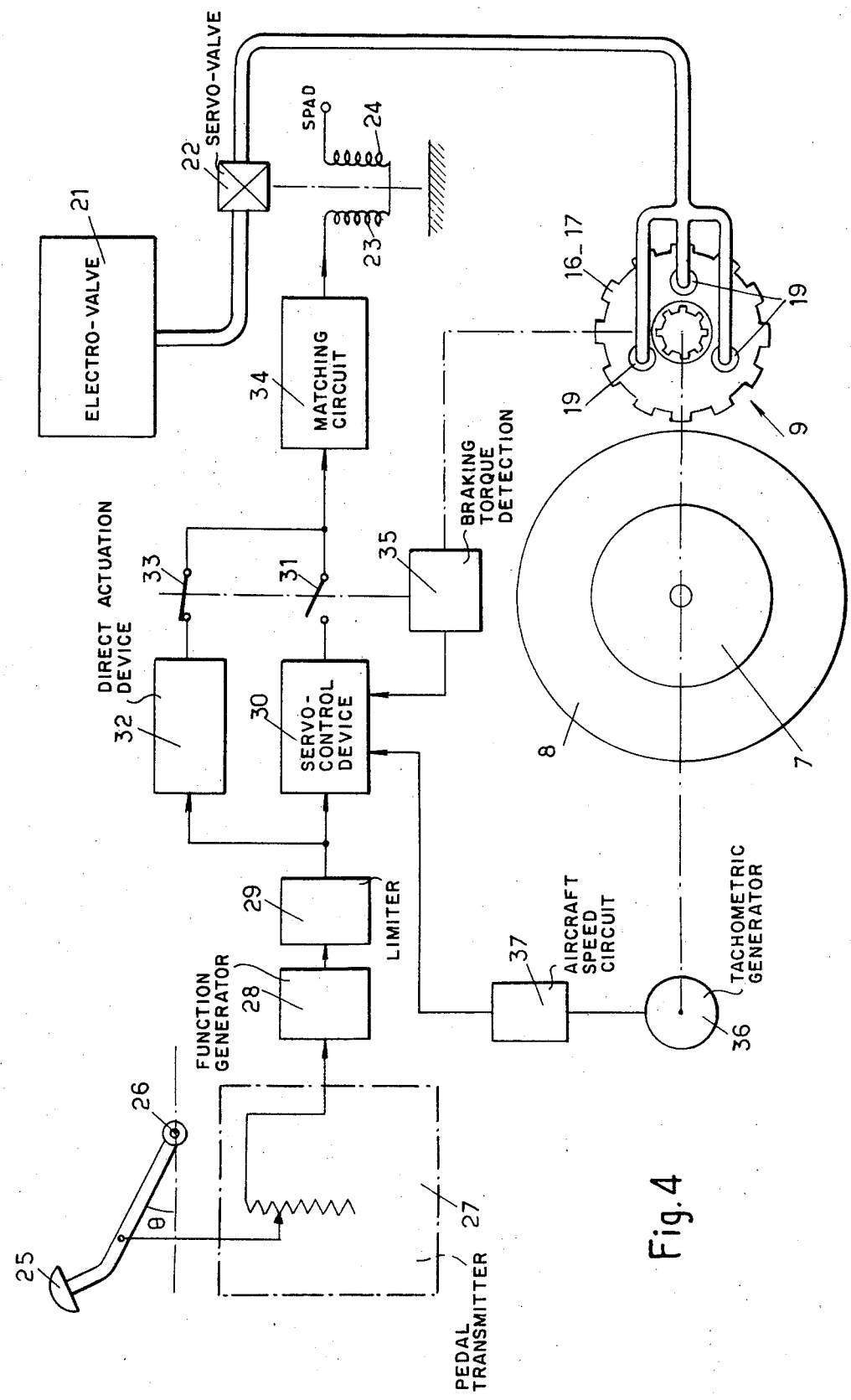
FIG. 4 is a block diagram of a simplified braking device in accordance with the invention.

As shown in FIG. 4, which schematically shows a braking device according to the invention, the jacks 19 are fed by a hydraulic pump and an electrovalve 21, and via a servo-valve 22.

Figure 5:
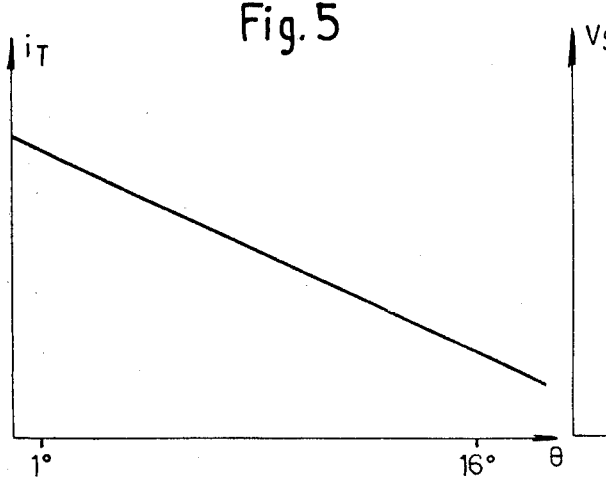
FIGS. 5 to 8 are diagrams illustrating the functioning of the device of FIG. 4.
Figure 6:
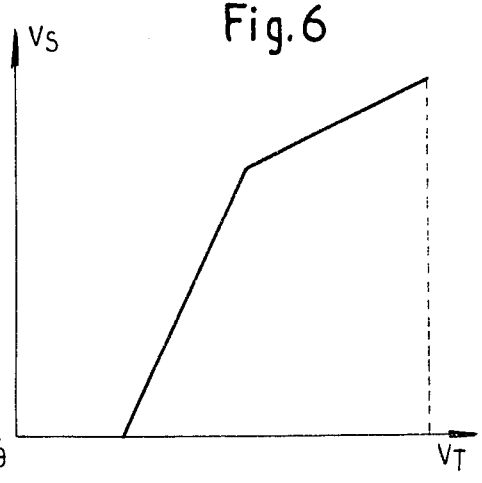
Figure 8:
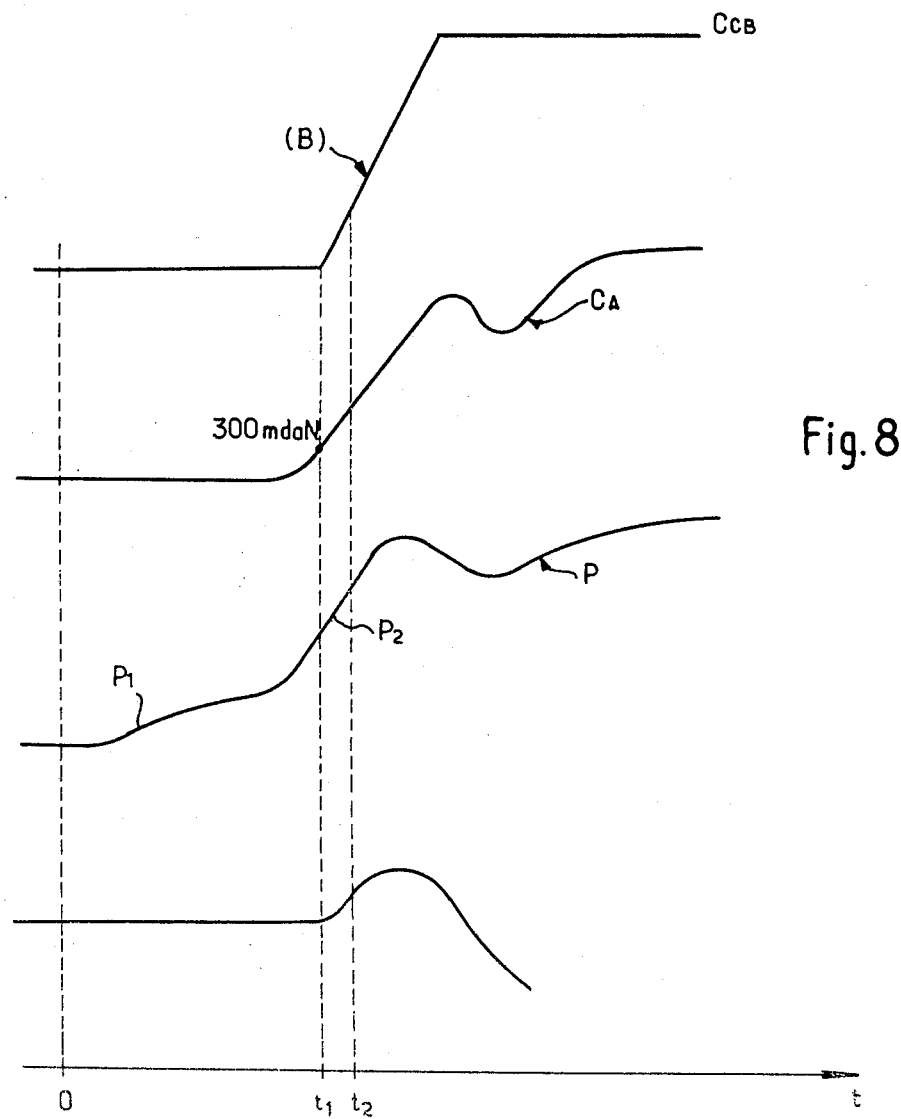

This servo-valve 22 is normally maintained closed by the current passing through a control winding 23, which receives the synthesis of the different electric signals of the assembly. A second winding 24 is connected to a braking regulating device, known as "SPAD", which corrects the opening of the valve 22 in the case of locking of the wheels. Such a "SPAD" device is already known and used on certain heavy-transport aircraft. A brake pedal 25, pivoting about an axis 26, controls a pedal transmitter 27, essentially constituted by a potentiometer fed by a voltage from the electrical circuit on board the aircraft. The transmitter 27 furnishes at its output a current $i_T$ whose nature, as a function of the angle of pivoting $\theta$ of the pedal 25, is shown in FIG. 5. This current converted into a proportional voltage $V_T$, is applied to a function generator 28 furnishing at its output, as a function of $V_T$, a voltage $V_S$, whose nature is shown in FIG. 6. When $V_T$ varies with the displacement of the slide of the potentiometer associated with the transmitter 27, the variation in voltage $V_S$ follows a broken line so that the beginning of the action of the pedal corresponds to a substantial braking, after which, to obtain an emergency stop for example, the final reduced stroke of the pedal causes an increase in the pressure up to the maximum value. This maximum value is determined and limited by a limiter 29, fed by voltage $V_S$. Function generator 28 is of a type which is known to those skilled in the art. A suitable generator is disclosed as item 28 in U.S. Pat. No. 3,948,569, filed Aug. 26, 1974, and is particularly described in column 4, lines 37–46 and FIG. 8 of said patent, said disclosure being expressly incorporated herein by reference.

Downstream of the limiter 29, the assembly comprises two branches in parallel, one comprising a torque servo-control device 30 and a contact 31 and the other a direct actuation device 32 and a contact 33. These two branches terminate in a matching circuit 34, serving as current generator for feeding the winding 23.

The contacts 31 and 33 are controlled by a device 35 for detecting braking torque, receiving its information from the strain gauges 20 and also furnishing its output signal to the servo-control device 30.

Furthermore, on the shaft of the wheel 7 (or on any other wheel of the aircraft) there is fixed at least one tachometric generator 36 which gives its output signal, via a treatment circuit 37 (comprising speed signal generator 38, comparator 40, logic device 41 and delay device 42), to the torque servo-control device 30.

Figure 7:
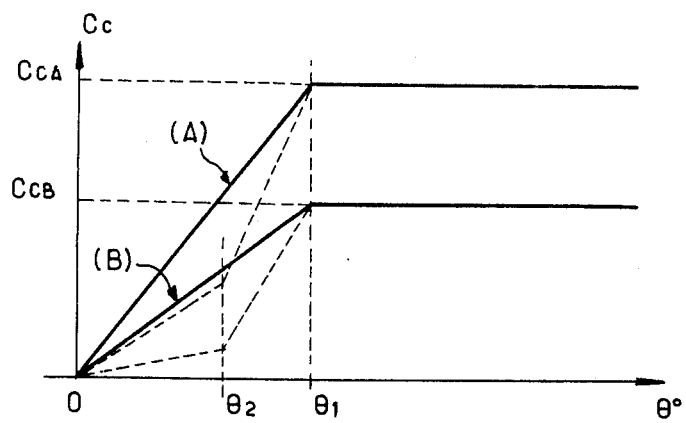

Said latter is capable of producing two possible laws of servo-control as a function of the speed of the aircraft (cf. FIG. 7).

If the speed of the aircraft is lower than 3m/s, the first law is such that the reference torque $C_C$ follows curve (A), as a function of the pivoting angle $\theta$ of the pedal 25. Between O and $\theta_1$, $C_C$ increases linearly then, at $\theta_1$ reaches a threshold of value $C_{CA}$. The second servo-control law provided for a speed greater than 3m/s (curve (B)) is similar to the first, but the value $C_{CB}$ taken by the reference torque $C_C$ at the threshold is lower than $C_{CA}$. Between O and $\theta_1$, instead of being linear, the variations of the laws A and B could increase according to the broken lines shown in dotted lines, in order slowly to increase from O to $\theta_2$ and more rapidly from $\theta_2$ to $\theta_1$ and thus increase the progressiveness of the depression of the pedal for the low values of $\theta$.

The device 32 advantageously comprises means limiting the gradient of increase in pressure in the brake, for example to a rate included between 50 and 200 bars/-seconds, when the pedal 25 is depressed. The release of the pedal may be followed, instantaneously, without condition of gradient, whilst, when the SPAD device functions, this gradient may be annulled.

The functioning of the braking device of FIG. 4 is explained hereinafter, taking as example the braking of a wheel initially rotating at high speed (beginning of landing of an aircraft). Before any braking action, by the very fact that the wheel is rotating at high speed, the servo-control device 30 is commutated by generator 36, to law (B), whilst the device 35, not detecting any braking torque, ensures that the contact 33 is closed and that contact 31 is open.

Consequently, when at instant $t = 0$ (cf. FIG. 8), the pilot begins to depress pedal 25, said latter acts on the brake via the direct circuit 27, 28, 29, 32, 33, 34 and 23. This results in the pressure (P) of the hydraulic fluid firstly increasing slowly (portion P1 of the curve) due to the fact that it is necessary to bring discs 16 and 17 in contact with each other and to fill the jacks 19 with pressurised fluid. During this phase P1, the pressure increase gradient is lower than the gradient of 200 bars per second, imposed as upper limit by the device 32. As soon as the jacks 19 are filled and the discs 16 and 17 are in contact, the pressure of the hydraulic fluid increases very quickly (portion P2 of the curve) to reach the controlled level. The actual braking torque $C_A$ measured by the gauges 20, follows the variations in the pressure P, and, at instant $t1$, increases to value 300 mdaN. At this instant, the device 35 opens the contact 33 and closes contact 31.

Consequently, the direct braking is replaced by braking via law (B) of the servo-control device 30. It will de noted that, at instant $t1$, the reference torque $C_{CB}$ is still zero, whilst the actual torque $C_A$ reaches the value of 300 mdaN. Consequently, the braking regulation associated in known manner with the device of FIG. 4 gives a provisional order for brake-release.

In this way, the torque peak due to the rapid increase in the pressure in the brake is attenuated; at instant $t2$, as soon as equality is realised between the braking torque $C_A$ and torque $C_{CB}$, the first follows the second in servo-controlled manner.

Further to the action of the brake 9 on the wheel 7, the speed of the aircraft decreases and, at a certain moment, passes through the value of 3m/s for which the tachometric generator 36 sends an order to the servo-control device 30 for said latter to commutate from one law of servo-control to the other and now imposes law (A) on the braking torque $C_A$, instead of law (B). From this speed, the torque $C_A$ is thus controlled by the law (A) until the wheel 7 stops.

Figure 9:
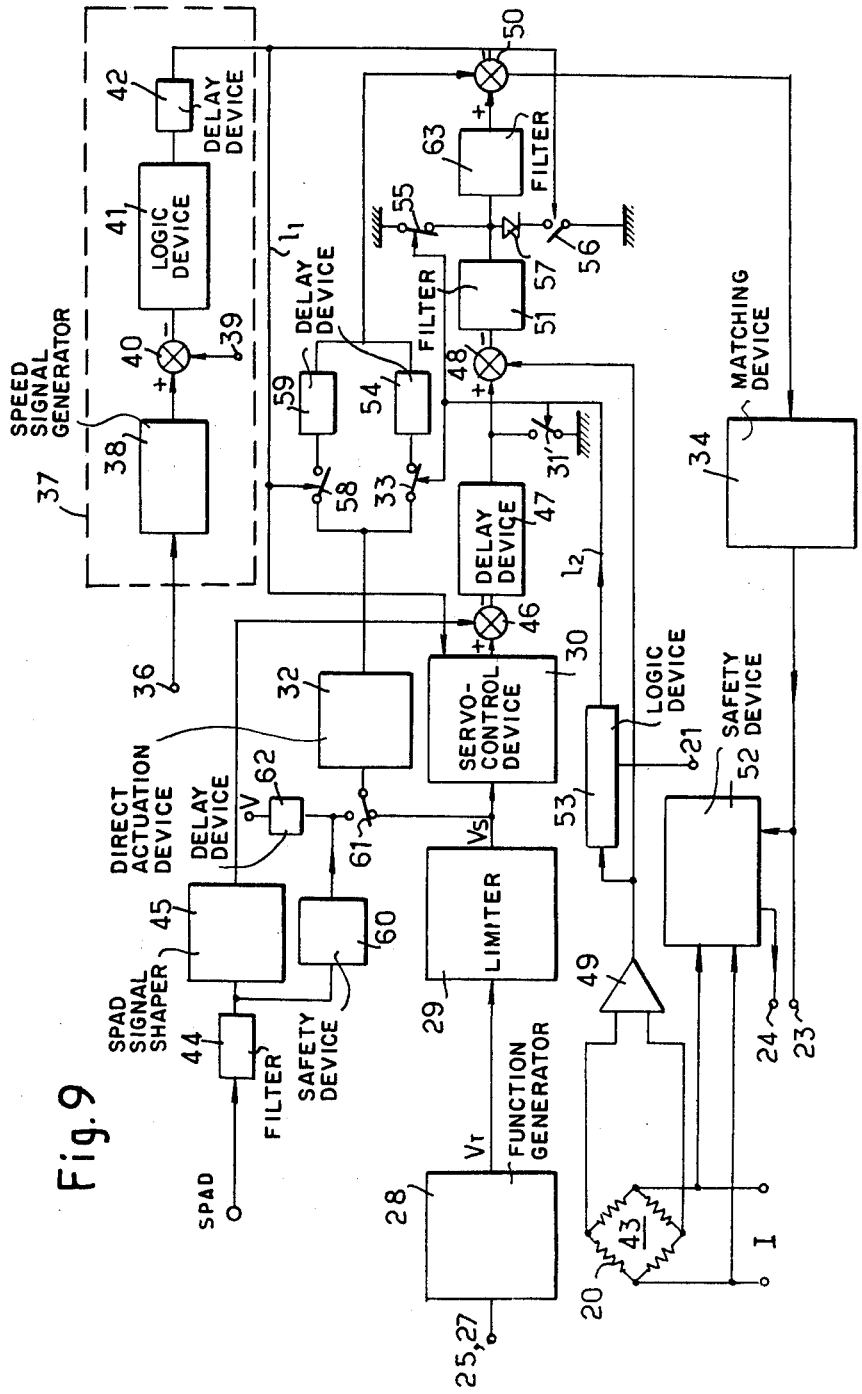
FIG. 9 is a block diagram of a more complete braking device than that of FIG. 4, in accordance with the invention.

FIG. 9 shows a block diagram of a more complete embodiment of a braking device according to the invention. In this Figure, the elements similar to those of FIG. 4 are designated by the same reference numerals.

The device of FIG. 9 is particularly intended for actuating brakes 9 with carbon discs 16 and 17 mounted on a heavy-transport aircraft and for protecting these brakes in all conditions of braking on the ground (swoop, rolling, ground movement, "static" i.e. stationary with brakes on but with reactors exerting full thrust).

The structural characteristics of the carbon discs are such that the braking torque must be lower than 2550 mdaN during rolling and 3100 mdaN at "static". Furthermore, this device makes it possible to avoid sending full pressure of fluid into the hot brake, particularly at the end of braking, which would risk permanently deforming the holding plate 14.

For these reasons, the device of FIG. 9 makes it possible to obtain:

a torque regulation for speeds greater than 3m/s. The value of the reference torque $C_{CB}$ as a function of the depression of the brake pedal must not exceed the nominal value of 2300 mdaN.

a torque peak-chopping for speeds lower than 3m/s, occuring only to prevent the braking torque from exceeding 2800 mdaN, whatever the mode of braking.

a limitation to 217 bars of the maximum pressure of the braking fluid.

The information furnished to the device come:

from the pedal 25 (not shown in FIG. 9) via the assembly 28 and limiter 29 (cf. FIG. 6);

from the tachometric generator 36 via the circuit or any other known device indicating the speed of the aircraft.

This treatment circuit 37 comprises a speed signal generator 38 for producing an aircraft speed signal, a reference 39 corresponding to a speed of 3 m/s, a comparator 40 for comparing the signals coming from devices 38, 39, a logic device 41 delivering a logic signal $l_1$ equal to "0" if the speed is greater than 3 m/s and to "1" if the speed is lower than 3 m/s. The logic signal $l_1$ issuing from device 41 is transmitted to the servo-control device 30 via a delay device 42 of 3 seconds.

from gauges 20, mounted in a bridge 43 fed from a D.C. current I.

from the SPAD regulator, acting in the manner described hereinafter, to give a brake-release order. For example, for complete brake release, the SPAD regulator delivers a D.C. voltage of + 13 V, whilst for complete braking, this voltage is zero.

The voltage delivered by device 30 (corresponding to the reference torque) is corrected, at the output of said latter, by the signal coming from the SPAD device, via a filter 44 and a treatment device 45. To this end, these two signals are combined in a subtractor 46. Such a correction is necessary since a brake-release order given by the SPAD device is translated by a reduction in the braking torque. The value of the braking torque given by the servo-control law could therefore not be reached and the torque regulation would tend to give the order for complete braking. There would be opposition between the action of the SPAD device and the torque regulation. It is therefore necessary to introduce the order for brake release at the level of the reference torque $C_C$. The reduction of said latter is proportional to the amplitude of the order for brake-release coming from the SPAD device. The signal leaving the subtractor 46 (modified reference torque) is timed by a delay device 47, then, in a comparator 48, compared with the signal coming from the gauge bridge 43 via an amplifier 49. The delay device 47 is such that it furnishes a time delay of 0.25 s to the depression of the pedal 25 and a time delay of 0.5 s to the release thereof. The output of the delay device 47 is connected to earth by a parallel contact 31', replacing the series contact 31 of FIG. 4.

The output signal of the comparator 48 and that of the device 32 are transmitted to the current generator 34, via an adder 50. Between the comparator 48 and the adder 50 there is disposed a stabilisation filter 51, whose transfer equation is for example $K/1 + bp$, $p$ being the Laplace operator and K and b constants.

The output of the filter 51 is connected to earth, on the one hand, by a contact 55 which is normally closed, on the other hand, by a contact 56 which is normally open, in series with a diode 57.

A safety device 52 detects, by measuring the output voltage of the current generator 34, a cut-out or connection to earth of the circuit downstream of the said generator. Similarly, this safety device 52 permanently detects a default in feed of the gauge bridge 43. In case of default, the device 52 sends a constant brake-release order to the coil 24.

A logic device 53 receives signals from the gauge bridge 43 and from the electrovalve 21 and produces a logic signal $1_2$ indicating both that the measured braking torque $C_A$ is greater than 300 mdaN and that the electrovalve 21 is energized. Before any braking, the torque $C_A$ is zero and the electrovalve 21 is de-energized, i.e. the hydraulic braking circuit is not fed. In this case, the contacts 31', 33 and 55 are closed. Consequently, the voltage $V_S$, corresponding to the released pedal, is transmitted directly to the generator 34, through device 32. As soon as the pilot presses on the pedal 25, he energizes the electrovalve 21 through path 32, 50, 34 and 23 and consequently the brake 9 is actuated in the manner indicated hereinabove. As soon as the braking torque $C_A$ reaches 300 mdaN, the signal $1_1$ opens contacts 31', 33 and 55. Consequently, the torque servo-control is released and the reference torque reaches the value given by the pedal 25, through the time delay of 0.25 s of the delay device 47, whilst the action of the device 32 is inhibited. However, the value of the output voltage of the device 32, which is necessary for reaching a torque $C_A$ of 300 mdaN, remains memorized in a device 54 with time delay of 0.01 s (memorization time).

As long as the speed of the aircraft is greater than 3 m/s, the logic signal $1_1$ (coming from device 41, through the delay device 42) remains at "0" and, in consequence, the servo-control device 30 imposes law (B). Three seconds after the aircraft has reached, by braking, the speed of 3 m/s, the logic signal $1_1$ passes to "1", this closing a contact 58, which is normally open, mounted with a delay device 59, in parallel on the contact 33 and the delay device 54. The time delay of the delay device 59 is for example equal to 0.5 s. Consequently, the output signal of the device 32 is transmitted to the current generator 34 with a time delay of 3 s. The value "1" of the logic signal $1_1$ has, furthermore, closed contact 56, connecting the output of the filter 51 to earth, through diode 57. The sense of said latter is such that the servo-control is inhibited in the sense of braking, but continues to control brake release. Consequently, it is the device 32, alone, which controls the braking, the servo-control ensuring only that the torque does not exceed the maximum reference value. Moreover, the logic signal $1_1$ causes the device 30 to pass progressively in three seconds from law (B) to law (A). The regulation therefore functions by torque peak-chopping according to law (A), the brake being controlled at braking through the device 32.

When the braked wheel 7 is locked and its slide exceeds 45% or the adherence of the runway is not sufficient for the required braking torque, a safety device 60, belonging to the SPAD device, actuates the contact 61 so that said latter passes from its position for which the device 32 receives the signal $V_S$ emitted by the device 29, to its other position for which the device 32 receives a fixed voltage V, through a delay device 62 of 0.2 s. In this way, the slide of the wheel is avoided, by choosing an adequate value for the voltage V. As soon as the wheel stops sliding, the contact 61 takes back its original position.

During swoop (i.e. during the period of landing when the aircraft is moving on its landing gear whilst its front wheel is not yet in contact with the ground), the regulation of the braking system SPAD sends an order for complete brake release and the safety device 60 is actuated. Consequently, even if the pilot pushes on pedal 25, the braking torque exerted remains zero and the winding 23 of the servo-valve 22 is fed from voltage V. As soon as the front wheel touches the ground, the action of the safety device 60 is eliminated and the device 32 receives signal $V_S$. The braking is then effected in the manner mentioned hereinabove.

When stationary, even if the reactors exert their maximum thrust, stop must be ensured with a maximum braking torque of 2800 mdaN and a maximum pressure of 217 bars (with 17 bars corresponding to the pressure necessary for filling the brake). This results in the gain of the brake having to be greater than (2800/200) = 14 mdaN/bar.

When the brake pedal 25 is released, there is risk of an over-torque. In fact, if the pilot releases the brake sharply (instantaneous elimination of the pressure in the brake) phenomena of jamming may appear in the brake and may cause too rapid over-torques to be absorbed effectively by the regulation. To avoid this drawback, the delay devices 47 and 59 make it possible to time the effect of the release of the pedal, associated with a corresponding timing of the de-energization of the electro valve 21.

It is known that the landing gear of the type as shown in FIGS. 1 and 2 are the seat of two types of vibrations, one with transverse energization and the other with longitudinal energization. Experience has shown that the torque regulation described hereinabove does not amplify the transverse vibrations, but on the contrary amplifies the longitudinal vibrations. It is therefore advantageous to introduce a band-cut-out filter 63, of frequency corresponding to said longitudinal vibrations, in the regulation loop.

Figure 10:
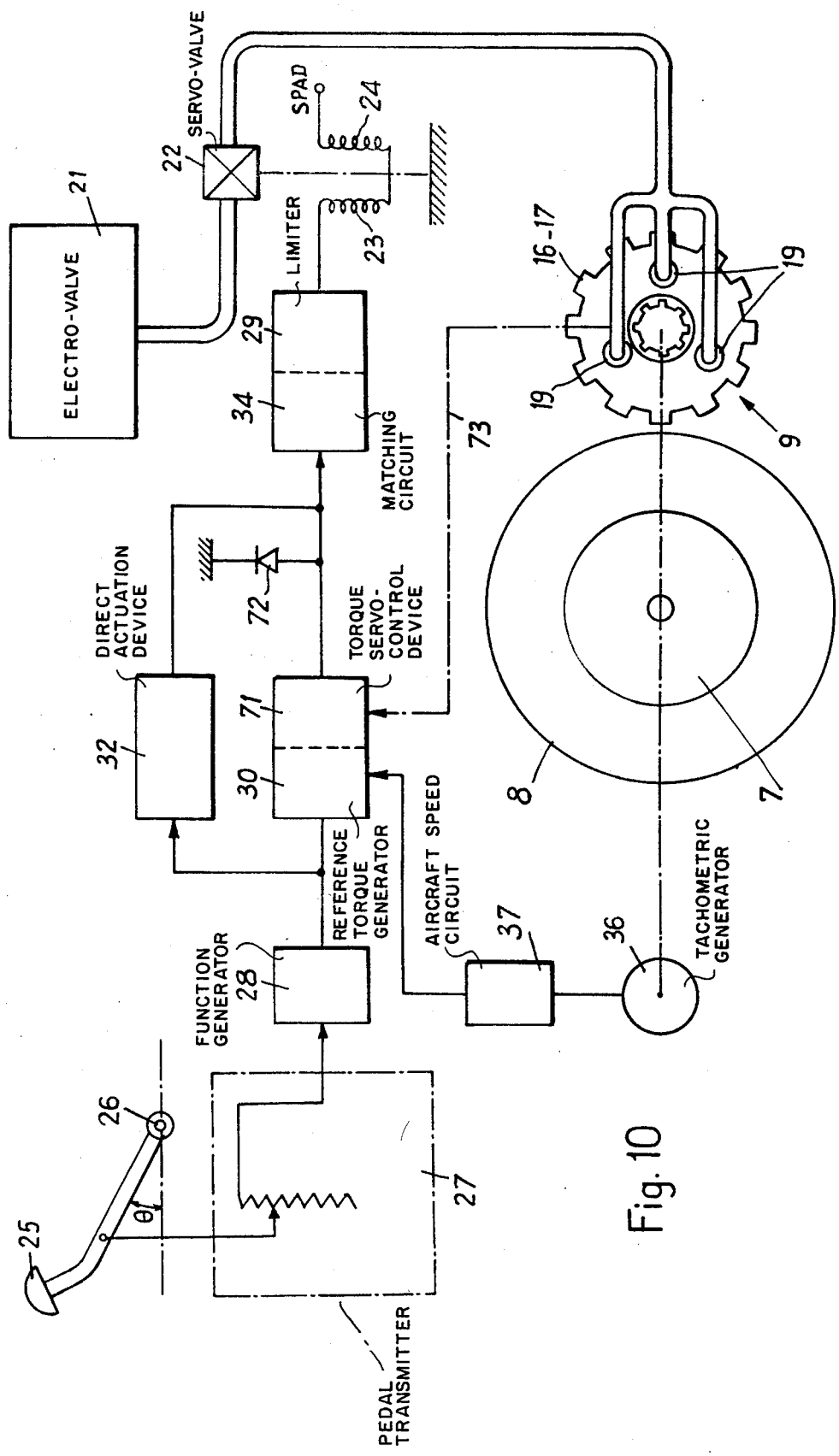
FIG. 10 is a block diagram of a variant embodiment of a simplified braking device according to the invention.

FIG. 10 shows a variant embodiment of the device of FIG. 4. Downstream of the assembly 28, the circuit comprises two branches in parallel, one comprising a device 30 for producing the reference torque and a torque servo-control device 71, and the other the direct actuating device 32. These two branches terminate in the matching circuit 34, supplying the winding 23 through the limiter 29. The output of the device 71 is connected to earth via a unidirectional conduction device 72.

Furthermore, the tachometric generator 36 sends its output signal via the treatment circuit 37 to the device 30 for producing the reference torque. Said latter is capable of producing the two laws of servo-control shown in FIG. 7.

The functioning of the braking device of FIG. 10 is explained hereinafter.

At the beginning of landing of the aircraft, the wheel is rotating at high speed and the device 71 is commutated to law (B). When the pilot begins to depress pedal 25, said latter acts on the brake via the direct circuit 27, 28, 32, 34, 29 and 23. This results in the pressure of the hydraulic fluid in the brake increasing with a pressure gradient limited by device 32. The actual braking torque measured by the gauges 20, follows the variations in pressure. If, at a given instant, this actual braking torque (brought to device 71 via line 73) exceeds the reference torque $C_{CB}$, the servo-control device 71 reduces the pressure. However, it will be noted that, due to the unidirectional conduction device, of which the direction is provided to this end, the device 71 acts only in the sense of a brake release to return the actual braking torque to the value of the reference torque associated with the depression θ corresponding to the pedal 25.

When the speed of the wheel reaches 3 m/s by decreasing, the generator 36 causes the device 71 to commutate so that it now imposes on the braking torque not to exceed the reference torque determined by law (A), in place of that corresponding to law (B).

FIG. 11 shows the block diagram of a more complete embodiment of a braking device according to FIG. 10.

For the reasons mentioned hereinabove, the device of FIG. 11 makes it possible to obtain:

a torque peak-chopping, whatever the speed, occurring only to prevent the braking torque from exceeding the reference torque determined, according to law A or law B, by angle θ of the pedal 25.

a limitation of 217 bars of the maximum pressure of the brake fluid by the module 29. The information supplied to the device come:

from the pedal 25 and from the transmitter 27 (not shown in FIG. 11) via the assembly 28 (cf. FIG. 6);

from any known device 36 indicating the speed of the aircraft, via the shaping circuit 37;

from gauges 20, mounted in the bridge 43 supplied by the D.C. current I;

from the SPAD regulator, acting in the manner described hereinafter, to give an order for brake release substantially proportional to the wheel lock.

The voltage delivered by device 30 (corresponding to the reference torque) is transmitted to the delay device 47 and is corrected, at the output of this latter, by the signal coming from the SPAD device via the filter 44 of the treatment device 45 and a delay device 74. To this end, these two signals are combined in the subtractor 46. As specified hereinabove, such a correction is necessary since an order for brake release given by the SPAD device is translated by a reduction in the braking torque. The value of the braking torque imposed by the servo-control law could therefore not be reached, and this would result in an action of complete braking directly. The signal leaving the subtractor 51 (modified reference torque) is compared, in the comparator 48, with the signal coming from the gauge bridge 43 via the amplifier 49. The delay device 74 introduces a delay of 0.15 s in the disappearance of the signal, without introducing a delay upon establishment of said signal.

The outputs of the comparator 48 and of the device 32 are connected to the current generator 34 via the adder 50. Between the comparator 48 and the adder 50 is disposed a polarised amplifier 71 with unidirectional conduction, of which a voltage reference may be given either by the earth or by a memorisation device 76 thanks to a double contact 77. The connection to earth corresponds to the rest position of the contact 77, whilst the connection to the memorisation device 76 corresponds to the operating position of said contact. Furthermore, the memorisation device 76 is connected to the output of the amplifier 71 via a normally closed contact 78.

Two delay devices 79 and 80 are mounted in parallel between the device 32 and the adder 54. The delay device 79 introduces a delay of 0.5 s upon release of the pedal 25, whilst the delay device 80 introduces a delay of 0.01 s upon depression of said pedal.

A logic circuit 81, enabling a signal to be instantaneously established, but introducing a time delay of 0.05 s upon disappearance of said signal, receives a control signal from a device 82, receiving the SPAD signal through the filter 44. The device 82 sends a signal to circuit 81 only if the voltage SPAD is greater than a certain relatively low voltage level, for example 2 volts, i.e. if the SPAD regulator controls a slight brake release. The circuit 81 produces a logic signal $1_2$ that may simultaneously control the contacts 77 and 78 and lock the pressure gradient at the level of the device 32. As in the device of FIG. 9, the device of FIG. 11 comprises the safety device 52.

Before any braking, the braking torque measured is zero and the electrovalve 21 is de-energized, i.e. the hydraulic braking circuit is not supplied. In this case, the contacts 77, 78 are in the position shown in FIG. 11. Consequently, the voltage $V_S$ corresponding to the released pedal is transmitted directly to the generator 34, through device 32. As soon as the pilot presses on pedal 25, he energizes the electrovalve 21 by path 32, 80, 34, 29 and 23 and, consequently, the brake 9 is actuated in the manner indicated hereinabove. As long as the braking torque is lower than the reference torque corresponding to the depression of the pedal, nothing changes. In fact, at this moment, the polarity of the signal is given by the comparator 48 and, corresponding to the difference in the signals representing the braking torque measured and the corresponding reference torque, is such that the amplifier 71 is not conducting.

On the other hand, if the measured braking torque becomes greater than the reference torque, the polarity of the signal coming from comparator 48 is reversed and the amplifier 71 becomes conducting. This amplifier is unidirectionally conducting and its sense of conduction is such that it allows only the signals corresponding to a brake release to pass. These signals are combined, in the adder 50, with the braking signals coming from the device 32 and a brake release action is produced via the generator 34.

During all this time, the memorisation device 76 continuously stores the level of the output signal of the amplifier 71.

The adjustment of the device 30 is provided for a low brake gain, so that the torque peak chopping functions permanently.

As long as the speed of the aircraft is greater than 3 m/s, the logic signal $1_1$ (coming from device 41, through the delay device 42) remains at "0" and, consequently, the torque-forming device 30 imposes law (B). Three seconds after the aircraft has reached, by braking, the speed of 3 m/s, the logic signal $1_1$ passes to "1", this causing the device 30 to pass progressively in three seconds from law (B) to law (A). The regulation therefore now functions by torque peak chopping according to law (A), the brake always being controlled at braking through device 32.

When the braked wheel 7 begins to lock and consequently the SPAD device emits a signal which is still relatively weak, the device 82 sends a signal to circuit 81 which, by its signal $1_2$, causes contacts 77 and 78 to trip. At this moment, braking is controlled from the value attained by the gradient at 32, reduced by the over-torque signal produced by the amplifier 71, from the difference signal of the comparator 48. Because of the tripping of contacts 77 and 78, the conduction of the amplifier 71 no longer has earth for reference, but the value which the difference signal had at the moment of tripping and which is stored in the memorising device 76. Brake release may then be more effective, on the one hand because the value of the braking signal is limited to what it was at the moment of tripping and on the other hand because the action of the amplifier 71 is increased thanks to the change in reference.

When the braked wheel 7 locks further and its slide exceeds 45% or when the adherence of the runway is not sufficient for the required braking torque, the safety device 60 belonging to the SPAD device actuates two contacts 83 and 84 to pass said latter from their position for which the devices 30 and 32 receive the signal $V_S$ emitted by the device 28 to their other position for which the device 30 is switched on and the device 32 receives a fixed voltage V, through the delay device 62 of 0.2 s. As soon as the slide of the wheel is annulled, the contacts 67 and 68 take back their initial position.

As explained hereinabove, during the swoop, the regulation of the SPAD braking system sends an order for complete brake release and the safety device 60 is actuated. As soon as the front wheel touches the ground, the action of the safety device 60 is eliminated and the device 32 receives the signal $V_S$.

FIG. 12 shows an embodiment of the polarized unidirectional conduction device of the device of FIG. 11.

The device 71 is formed by a first operational amplifier 91 whose positive input is connected to earth via a resistance 92, whilst the negative input is connected to the comparator 48 (which delivers the comparison signal between the braking torque measured and the reference torque). This negative input is, furthermore, connected on the one hand to the output of the amplifier 91 via a resistor 93 and a capacitor 94 in parallel (amplifier assembly) and on the other hand via a resistor 95 and a diode 96 in series at the output of a second operational amplifier 97 (with again of 100) whose positive input is connected to earth via a resistance 98 and to the contact 78 via a resistance 99. The negative input of the operational amplifier 97 is connected on the one hand to the output of said latter via a resistor 100 and on the other hand to the contact 77 via a resistor 101. The memorization device 76 is formed by an operational amplifier 102 used as follower, of which the positive input is connected to the resistor 104 and connected to earth via a capacitor 103, whilst its negative input is connected to its output. The output of the amplifier 102 is connected to one of the contacts of the double contact 77.

When the difference between the reference torque and the measured torque is positive, the amplifier 91 is not conducting, its output is connected to earth, but it is conducting in the opposite case. In this latter case, it provides an increase in the output voltage (with respect to earth).

If, moreover, the SPAD device acts via $1_2$, the output voltage of the amplifier 91 increases, no longer with respect to earth, but with respect to the value of the voltage taken by the capacitor 103, since the contact 77 is then commutated and the contact 78 open. The capacitor 103 memorises the output voltage of 91 at the moment of opening of the contact 78.

Thus, in operation, the output voltage of the amplifier 91 can only increase. It is sufficient to associate with this amplification the sense of a brake release for the device of FIG. 12 to be able to function only by torque peak-chopping.

As in the case of FIG. 9, a band-cut-out, filter 63 is introduced into the regulation loop.

What we claim is:

1. A method for controlling a hydraulic disc brake, particularly for aircraft, said brake being associated with at least one wheel and actuated by a mobile member, comprising the following steps:
   detecting the braking torque actually exerted on the wheel;
   servo-controlling said actual braking torque by a reference braking torque such that a predetermined value of said reference torque corresponds to a determined displacement of said mobile member, the value of the reference torque increasing with the displacement of said mobile member up to a certain position, beyond which the reference torque takes a maximum threshold value indpendent of said displacement.

2. A method for controlling a hydraulic disc brake, particularly for aircraft, said brake being associated with at least one wheel and actuated by a mobile member, comprising the following steps:
   detecting the braking torque actually exerted on the wheel;
   servo-controlling said actual braking torque by a reference braking torque such that a predetermined value of said reference torque corresponds to a determined displacement of said mobile member, the actual braking torque being controlled by a first reference torque when the wheel advances at a speed greater than a speed threshold and by a second reference torque when this speed is lower than said speed threshold, the values of the reference torques increasing with the displacement of said mobile member up to certain positions thereof, beyond which the reference torques take maximum threshold values independent of said displacement and the maximum threshold value of the second reference torque being greater than the maximum value of the threshold of the first.

3. A method for controlling a hydraulic disc brake, particularly for aircraft, said brake being associated with at least one wheel and actuated by a mobile member, comprising the following steps:
   actuating said mobile member for direct control of the brake;
   detecting the braking torque actually exerted on the wheel;
   comparing said detected braking torque with a predetermined value; and
   if said detected value is lower than said predetermined value, allowing said mobile member to continue to directly actuate the brake; or
   if said detected value is greater than said predetermined value, servo-controlling said detected braking torque by a reference braking torque, such that a determined value of said reference braking torque corresponds to a determined displacement of said mobile member;
   the reference torque being zero at the moment when the braking torque obtained by direct action reaches said predetermined value.

4. A method for controlling a hydraulic disc brake, particularly for aircraft, said brake being associated with at least one wheel and actuated by a mobile member, comprising the following steps:
   actuating said mobile member for direct control of the brake;

detecting the braking torque actually exerted on the wheel;

comparing said detected braking torque with a predetermined value; and if said detected value is lower than said predetermined value, allowing said mobile member to continue to directly actuate the brake; or if said detected value is greater than said predetermined value, servo-controlling said detected braking torque by a reference braking torque, such that a determined value of said reference torque corresponds to a determined displacement of said mobile member; and when the speed of the wheel is lower than a speed threshold, the brake is actuated directly in the sense of braking, whilst the servo-control functions only in the sense of a brake release.

5. A device for controlling a hydraulic disc brake associated with at least one wheel of a vehicle, particularly an aircraft, and actuated by a mobile actuating member, said device comprising:

a transducer for converting the displacement of said actuating member into an electric signal and a servo-valve for controlling the hydraulic fluid in the brakes controlled by a control winding;

at least one sensor producing a first electric signal representing the braking torque actually exerted on the wheel when the brake is actuated by said actuating member and supplying this first electric signal to a device, arranged between said transducer and said control winding, producing, as a function of the displacement of said actuating member, at least a second electric signal representing a reference braking torque to be obtained and controlling the feed of said control winding by said second signal;

said device further comprising, between the transducer and control winding of the servo-valve, an electric circuit composed of two branches in parallel which may be used alternately, the first of said branches corresponding to the direct action of said member on the brake and the second to the torque servo-control of the functioning of the brake; and, associated with said second branch of the circuit, at least a first contact which, in rest position, inhibits the action of said branch, whilst with the first branch of circuit is associated a second contact allowing, in rest position, the action of said second branch;

said device further comprising means producing a signal indicating simultaneously that the servo-valve is energized and that the braking torque is greater than the predetermined value, the signal produced by said first means being able to trip the first and second contacts;

a third contact whose rest position normally inhibits the functioning of the first circuit branch, mounted in parallel on the second contact, and a fourth contact associated with the second circuit branch, so that at rest, said fourth contact allows the action of said second circuit branch;

said third and fourth contacts being actuated by second means producing a signal indicating that the speed of the wheel is greater than said speed threshold and, in its operating position, said fourth contact allowing the functioning of the servo-control only in the sense of a brake release.

6. A device for controlling a hydraulic disc brake associated with at least one wheel of a vehicle, particularly an aircraft, and actuated by a mobile actuating member, said device comprising:

a transducer for converting the displacement of said actuating member into an electric signal and a servo-valve for controlling the hydraulic fluid in the brakes controlled by a control winding;

at least one sensor producing a first electric signal representing the braking torque actually exerted on the wheel when the brake is actuated by said actuating member and supplying the first electric signal to an apparatus, arranged between said transducer and said control winding, producing, as a function of the displacement of said actuating member, at least a second electric signal representing a reference braking torque to be obtained and controlling the feed of said control winding by said second signal;

said device further comprising, between the transducer and control winding of the servo-valve, an electric circuit composed of two branches in parallel which may be used alternately, the first of said branches corresponding to the direct action of said member on the brake and the second to the torque servo-control of the functioning of the brake;

said second branch comprising a servo-control device functioning both for braking and brake-release, a unidirectional conduction device being associated with said servo-control device in order that only its brake-release action be transmitted to the servo-valve.

7. A device as claim in claim 6, wherein said two branches in parallel are connected on the servo-control side by an apparatus enabling their signals to be combined, the branch corresponding to the servo-control functioning comprising a polarized unidirectional conduction device receiving the signal from the means of comparison between the braking torque actually exerted on the wheel and the corresponding reference torque, said polarized device being conducting, in the sense of a brake release, only when the polarity of the comparison signal indicates that the braking torque exerted on the wheel is greater than said reference torque.

8. A device as claimed in claim 7, wherein said device is regulated for a low brake gain and produces a permanent peak-chopping servo-control action.

9. A device as claimed in claim 7, associated with a braking regulating device intended to avoid locking of the braked wheel, comprising, associated with the first and second circuit branch, means bringing into action the signals emitted by said regulating device, wherein said means employing the regulating device are sets of contacts that may cut out the circuit branch corresponding to the direct braking, whilst maintaining the value of the braking measured at the moment of the action of the regulating device and modifying the voltage of the polarized unidirectional conduction device.

10. A device as claimed in claim 9, wherein said sets of contacts connect, to the polarized unidirectional conduction device, a memorizing device having memorized the value of braking at the moment of action of the regulating device.

* * * * *